United States Patent [19]

Shaw et al.

[11] 3,867,134

[45] Feb. 18, 1975

[54] METHOD FOR PRODUCING STAINLESS STEEL IN A BASIC OXYGEN FURNACE

[75] Inventors: Richard B. Shaw, Natrona Heights; Richard F. Carlson, Tarentum, both of Pa.

[73] Assignee: Allegheny Ludlum Industries, Inc., Pittsburgh, Pa.

[22] Filed: Sept. 21, 1973

[21] Appl. No.: 399,570

Related U.S. Application Data

[63] Continuation-in-part of Ser. No. 267,340, June 29, 1972, abandoned.

[52] U.S. Cl. .................................. 75/60, 75/59
[51] Int. Cl. ........................................ C21c 5/32
[58] Field of Search ............................. 75/59, 60

[56] References Cited
UNITED STATES PATENTS
3,046,107    7/1962    Nelson .................................. 75/59

*Primary Examiner*—C. Lovell
*Assistant Examiner*—Peter D. Rosenberg
*Attorney, Agent, or Firm*—Vincent G. Gioia; Robert F. Dropkin

[57] ABSTRACT

Method for producing stainless steels in a top-blown vessel, characterized in that a mixture of cold chromium-containing material having a total carbon content of at least 3.5 percent is charged into the vessel, followed by top blowing with pure oxygen until in excess of about 50 percent, and preferably 70–80 percent of the total oxygen requirement is blown. The cold chromium-containing material constitutes at least 10 percent by weight of the total charge. Thereafter, a mixture of oxygen and a non-oxidizing gas is blown onto the surface of the melt preferably in two steps, the first of which is carried out with the lance at the normal blowing level above the surface of the molten metal and the second of which is carried out with the lance lowered or the gas impact pressure increased. This enables the attainment of less than 0.03 percent carbon in the blown heat.

11 Claims, No Drawings

METHOD FOR PRODUCING STAINLESS STEEL IN A BASIC OXYGEN FURNACE

CROSS-REFERENCES TO RELATED APPLICATIONS

This application is a continuation-in-part of copending application Ser. No. 267,340, filed June 29, 1972 and now abandoned.

BACKGROUND OF THE INVENTION

It is known that stainless steel can be refined in a basic oxygen furnace by forming an initial charge of liquid hot metal and cold scrap material. For example, cupola hot metal iron, high carbon ferrochromium and stainless steel scrap are conventionally charged into a BOF vessel, the mixture having a carbon content in excess of 3.5 percent. In the usual case, approximately 66 percent of the initial charge is cupola hot metal iron at approximately 2,600°F and 34 percent is cold material consisting of high carbon ferrochromium and stainless steel scrap or other cold materials. Slag forming ingredients and possibly slag conditioners are added to the charge either before or during oxygen blowing.

In order to obtain a final carbon content of 0.07 percent maximum utilizing prior art techniques, the end-point temperature after the oxygen blow must be in excess of 3,450°F. This end-point temperature, however, causes erosion of the refractory lining of the vessel and results in a decrease in lining life. Furthermore, in order to decrease the end-point temperature to a practical operating value of approximately 3,250°F to 3,300°F at which the vessel can be tapped, a back-charge of cold stainless crop ends must be charged into the vessel. This latter requirement involves the use of the scrap charging machine which is then unavailable for loading scrap for the next heat.

SUMMARY OF THE INVENTION

In accordance with the present invention, a method for producing stainless steel in a top-blown basic oxygen furnace is provided wherein a mixture of hot metal and cold chromium-bearing materials containing carbon in excess of 3.5 percent can be refined to achieve a maximum carbon content of only 0.03 percent with a maximum turn-down temperature of only 3,450°F, whereby the life of the refractory lining of the furnace vessel is materially increased.

Specifically, there is provided a method for producing stainless steel in a top-blown basic oxygen vessel to achieve a final carbon content of 0.03 percent maximum by the steps of (1) charging into the vessel molten ferrous metal and cold chromium-containing materials with the chromium materials constituting at least 10 percent by weight of the total charge and the molten and cold materials containing at least 3.5 percent by weight of carbon, (2) blowing essentially pure oxygen onto the surface of the molten ferrous metal through a nozzle positioned above the surface of the charge to melt the scrap and refine the melt until in excess of about 50 percent and preferably 70–80 percent of the total oxygen requirement is blown onto the surface and the carbon content of the bath is reduced to less than 0.15 percent, and (3) thereafter blowing a mixture of oxygen and a non-oxidizing gas onto the surface of the molten bath through the nozzle until the carbon content thereof has been reduced to below 0.03 percent while maintaining the temperature of the melt at a maximum temperature of about 3,450°F.

In the preferred embodiment of the invention, the non-oxidizing gas is an inert gas such as argon. As a specific example, after about 80 percent of the total oxygen requirement has been blown onto the surface of the bath with the nozzle approximately 40 inches above the surface of the bath, a mixture of non-oxidizing gas and oxygen is initially introduced through the nozzle at a ratio of about 5 parts oxygen to 2 parts non-oxidizing gas, the ratio being gradually decreased and then reversed until it becomes 5 parts non-oxidizing gas to 2 parts oxygen. The maximum ratio at either the beginning or end of that portion of the blow utilizing a mixture of gases can be as high as 6 to 1. While the mixture of gases is being blown onto the melt, and before the blow is completed, the lance is lowered from about 40 inches to 35 inches in order to assure intimate contact of the gas mixture with the turbulent metal. This can also be accomplished by increasing the total gas flow which increases the gas impact pressure on the molten bath. As was mentioned above, this procedure produces a maximum turn-down temperature of about 3,450°F and at the same time reduces the final carbon content to 0.03 percent maximum, far below the 0.07 percent carbon maximum attainable with prior art practices wherein the turn-down temperature was in excess of 3,450°F.

DESCRIPTION OF THE PREFERRED EMBODIMENT

In carrying out the invention, processing is begun by forming an initial charge of liquid hot metal and cold scrap (i.e., chromium-containing material) in a basic oxygen converter. For the purpose of this specification and the appended claims, "cold chromium-containing material" is considered to include all additions whether or not preheated, with the exception of liquid hot metal. The term includes slag forming ingredients, slag conditioners and reducing agents. The initial charge contains at least 10 percent by weight cold scrap materials and preferably 10 percent to 40 percent by weight, the remainder being hot cupola metal. A typical analysis for the hot metal is 4.25 percent carbon, 0.5 percent silicon, 0.5 percent manganese, less than 0.025 percent sulfur, less than 0.03 percent phosphorus and the balance iron. The mixture of hot metal and cold scrap materials, as mentioned above, contains in excess of 3.5 percent carbon. Nickel can be present in the liquid hot metal and/or the scrap if a chromium-nickel steel is to be produced.

Slag forming ingredients and possibly slag conditioners are added to the charge either before or during oxygen blowing. These typically constitute burnt lime, dolomitic burnt lime, and fluorspar. Oxygen is injected into the charge of liquid hot metal and scrap materials by top blowing from a nozzle usually positioned at the beginning of the blow about 40 inches above the surface of the metal bath.

After an empty basic oxygen vessel is charged with cold scrap materials, hot cupola metal at a temperature of about 2,600°F is poured into the vessel. The vessel is uprighted and oxygen is blown onto the surface of the molten metal through a 3-hole nozzle at the bottom of a water-cooled oxygen lance with the nozzle being approximately 40 inches above the surface of the bath. The injected oxygen reacts with the chromium, iron, manganese, silicon and carbon of the liquid hot metal, thereby generating heat which raises the temperature of the liquid hot metal and melts the scrap. Chromium, manganese and iron are preferentially combined with oxygen at a temperature below about 3,250°F and, therefore, the temperature is raised above 3,250°F as quickly as possible.

As was explained above, in prior art processes for producing stainless steel in a basic oxygen converter, pure oxygen was blown onto the surface of the molten metal bath during the entirety of the blow. In order to obtain 0.07 percent carbon maximum in the melt, with pure oxygen, the end-point temperature after the oxygen blow had to be in excess of 3,450°F, and possibly up to 3,600°F. This high temperature, however, caused an erosion of the refractory vessel lining and decreased its life. Furthermore, a backcharge of stainless steel crop ends was necessary to decrease the end-point temperature to a practical operating temperature of approximately 3,250°F to 3,300°F before the vessel could be tapped.

In accordance with the present invention, pure oxygen is blown onto the surface of the bath until at least 50 percent and preferably 70–80 percent of the total oxygen requirement has been blown; whereupon the pure oxygen is replaced by a mixture of a non-oxidizing gas, preferably an inert gas such as argon or the like, and oxygen. The mixture of gases can be blown onto the surface of the bath in the ratio of about 5 parts argon to 2 parts oxygen for the entire remainder of the blow. However, it is preferred that when the mixture is initially blown, it be rich in oxygen. Thus, the mixture can initially comprise 5 parts oxygen to 2 parts non-oxidizing gas. This mixture is blown for about 2 minutes, during which time the lance is lowered from 40 inches to 35 inches. Thereafter, the mixture is varied to provide equal parts of oxygen and non-oxidizing gas and the blow continued for another 2 minutes. Finally, the ratio is changed to 2 parts non-oxidizing gas to 5 parts oxygen and the blow completed in a period of about 3–4 minutes.

A typical process involves blowing oxygen through a 3-hole water-cooled oxygen lance at a blowing rate of 6,500 cubic feet per minute until 140,000 cubic feet of oxygen have been consumed. At the very start of the blow, the lance height above the bath is about 50 inches to avoid contact of the lance with any scrap projecting from the bath. After about 30,000 cubic feet of oxygen have been blown, the lance height is reduced to 40 inches. Since the initial or starting carbon is in excess of 4 percent, very little chromium is oxidized up to this point. During this initial blow, the fluxes are added. From the bench mark of 140,000 cubic feet of pure oxygen, a mixture of argon and oxygen is initially introduced through the lance at a ratio of 5,000 cubic feet per minute of oxygen to 2,000 cubic feet per minute of argon for a period of 2 minutes. During this initial period, the lance is lowered from 40 inches to 35 inches above the bath. Thereafter, the ratio is changed to 3,500 cubic feet per minute of oxgyen to 3,500 cubic feet per minute of argon for a period of 3 minutes. Finally, the ratio is changed to 2,000 cubic feet per minute of oxygen to 5,000 cubic feet per minute of argon for a period of 5–7 minutes, at which point the blow is completed with a total of 170,000 cubic feet of oxygen being consumed. At the completion of the blow, the vessel is rotated into a horizontal position for temperature and carbon determination. At this point, a backcharge containing a reduction mix composed of ferrochromium, silicon and fluorspar is added to recover chromium values from the slag as is taught, for example, in R. B. Shaw U.S. Pat. No. 3,507,642, issued Apr. 21, 1970. Following the addition of the reduction mix, the molten metal and slag are emptied into a dummy or blind ladle. Chemical and temperature tests are taken and the slag is decanted from the dummy ladle. The metal in the dummy ladle is poured into a teeming ladle. When a temperature suitable for teeming is obtained, the metal is poured into molds.

The following are specific examples of actual tests embodying the principles of the invention:

EXAMPLE I

In a heat designed to produce Grade 410S stainless steel, 35,000 pounds of 430 type stainless steel scrap and 22,000 pounds of high carbon ferrochromium were added to a basic oxygen converter together with 103,000 pounds of cupola hot metal. The theoretical oxygen required for the blow was 180,000 cubic feet. The oxygen blow was initiated and fluxes were added in the amounts of 2,000 pounds of fluorspar, 2,000 pounds of burnt dolomitic lime and 6,500 pounds of burnt lime. Pure oxygen was blown onto the surface of the bath at a lance height of 60 and then 40 inches until the bench mark of 132,000 cubic feet of oxygen was reached. At this point, the pure oxygen was replaced by a mixture of argon and oxygen in the ratio of 5,000 cubic feet per minute of oxygen to 2,500 cubic feet per minute of argon and the blow continued until the total amount of oxygen delivered through the lance was 144,000 cubic feet. The blow was then continued with a mixture of 3,500 cubic feet per minute of both argon and oxygen. At a total oxygen volume of 153,000 cubic feet the ratio was changed to 2,500 cubic feet per minute of oxygen and 5,000 cubic feet per minute of argon. The total amount of argon used was 32,100 cubic feet while the total amount of oxygen used was 160,000 cubic feet. The turndown temperature was 3,290°F and carbon content was 0.024 percent. The backcharge contained 5,200 pounds of ferrochromium silicon.

EXAMPLE II

In another example, wherein a heat of 405 stainless steel was desired, 32,000 pounds of type 430 stainless steel scrap were charged into a basic oxygen furnace together with 21,000 pounds of high carbon ferrochromium, 5,000 pounds of preheated type 430 stainless steel scrap and 106,000 pounds of cupola hot metal. The oxygen blow was initiated and fluxes were added in the amounts of 2,000 pounds of fluorspar, 2,000 pounds of burnt dolomitic lime, and 6,500 pounds of burnt lime. The calculated total amount of oxygen required for the blow was 167,000 cubic feet. Pure oxygen was blown as described in Example I until 140,000 cubic feet of oxygen was consumed. At this point pure oxygen was replaced by argon-oxygen mixtures as described in I above. Bench mark points for ratio changes were 150,000 cubic feet of oxygen and 160,000 cubic feet of oxygen. The total amount of argon used was 35,900 cubic feet while the total amount of oxygen used was 170,500 cubic feet. The turndown temperature was 3,360°F and the carbon content was 0.014 percent. The backcharge was 5,000 pounds of low carbon ferrochromium and 5,600 pounds of ferrochromium silicon.

EXAMPLE III

In still another example, where it was desired to produce type 409 stainless steel, 40,000 pounds of type 434 stainless steel scrap was charged into a basic oxygen converter together with 18,000 pounds of high carbon ferrochromium, 104,000 pounds of cupola hot metal. The oxygen blow was initiated and fluxes were added in the amount of 2,000 pounds of fluorspar, 2,000 pounds of burnt dolomitic lime and 6,500 pounds of burnt lime. The calculated theoretical amount of oxygen required was 172,000 cubic feet. Blowing was continued with pure oxygen until a bench mark of 130,000 cubic feet of oxygen was reached; whereupon, between 130,000 and 142,000 cubic feet of oxygen blown onto the surface of the melt, and with the lance positioned 40 inches above the surface, a mixture of argon and oxygen was blown at a ratio of 5,000 cubic feet per minute of oxygen to 2,500 cubic feet per minute of argon. Between 142,000 and 154,000 cubic feet of oxygen the ratio was 3700 cubic feet per minute of oxygen and 3,700 cubic feet per minute of argon. From 154,000 to 162,000 cubic feet of oxygen the ratio was further changed to 2,500 cubic feet per minute of oxygen and 5,000 cubic feet per minute of argon. The total oxygen used was 162,300 cubic feet and the total argon used was 36,800 cubic feet. The turndown temperature was 3,330°F and the carbon was 0.021 percent. The backcharge was 4,900 pounds of ferrochromium silicon.

EXAMPLE IV

In a heat designed to produce Grade 430A stainless steel, 18,000 pounds of type 430 stainless steel scrap and 27,500 pounds of high carbon ferrochromium were added to the converter together with 94,000 pounds of cupola hot metal and 5,000 pounds of preheated type 430 stainless steel scrap. The theoretical oxygen required for the blow was 165,000 cubic feet. After initiation of the blow, fluxes were added in the amount of 5,500 pounds of burnt lime, 1,200 pounds of fluorspar and 2,000 pounds of burnt dolomitic lime. Pure oxygen was then blown onto the bath until the bench mark of 95,000 cubic feet of oxygen was reached (about 66 percent of the total). Pure oxygen was then replaced by a mixture of argon and oxygen in the ratio of 3,000 cubic feet per minute of oxygen to 3,000 cubic feet per minute of argon and the blow continued until a total of 128,000 cubic feet of oxygen had been consumed. The blow was completed with 143,000 cubic feet of oxygen being consumed at a ratio of 2,000 cubic feet of oxygen per minute to 4,000 cubic feet of argon per minute. Turndown temperature was 3,300°F and final carbon content was 0.022 percent. The backcharge contained 5,300 pounds of ferrochromium silicon.

It can thus be seen that the present invention provides a new and improved process for achieving stainless steels in a top-blown basic oxygen converter having a final carbon content no greater than 0.03 from the starting material having a carbon content in excess of 4 percent, and wherein at least 10 percent and preferably 10 percent to 40 percent of the starting materials are cold scrap materials. As was explained above, the lower turndown temperatures experienced, at or below 3,450°F, materially increase the life of the furnace lining.

Although the invention has been shown in connection with certain specific embodiments, it will be readily apparent to those skilled in the art that various changes can be made to suit requirements without departing from the spirit and scope of the invention.

We claim as our invention:

1. In the manufacture of stainless steel having a carbon content of under 0.03 percent, the steps of:
   charging into a vessel molten ferrous metal and cold chromium-containing materials with the cold material constituting at least 10 percent by weight of the total charge and the mixture of molten and cold materials containing at least 3.5 percent by weight of carbon,
   top blowing essentially pure oxygen onto the surface of the molten ferrous metal through a nozzle positioned above said surface until at least 50 percent of the total oxygen required for refining has been blown onto the surface of the bath, and
   thereafter blowing a mixture of oxygen and a non-oxidizing gas onto the surface of the molten metal through said nozzle until the carbon content thereof has been reduced to below 0.03 percent.

2. The method of claim 1 wherein 70–80 percent of the total oxygen required for refining has been blown onto the surface of the bath before said mixture of oxygen and a non-oxidizing gas is blown.

3. The method of claim 1 wherein said non-oxidizing gas comprises an inert gas.

4. The method of claim 1 wherein said mixture of oxygen and non-oxidizing gas contains 5 parts non-oxidizing gas to 2 parts oxygen.

5. The method of claim 1 wherein the mixture of oxygen and a non-oxidizing gas is initially blown onto said surface with the ratio of oxygen to non-oxidizing gas being greater than one and the ratio then decreased until it is less than one.

6. The method of claim 5 wherein the ratio of oxygen to non-oxidizing gas is initially 6 to 1 and is then reduced until at the end of a blow it is 6 parts non-oxidizing gas to 1 part oxygen.

7. The method of claim 1 wherein said nozzle is at a predetermined height above the surface of said bath while pure oxygen is being blown thereon, the nozzle remaining at said predetermined height when the mixture of oxygen and non-oxidizing gas is initially blown onto the surface of the bath, and thereafter lowering said nozzle relative to the surface of the bath after a predetermined amount of said mixture of oxygen and non-oxidizing gas has been blown onto the surface.

8. The method of claim 7 wherein said nozzle is lowered from about 40 inches above the surface of the bath to a distance of 35 inches above the surface of the bath.

9. The method of claim 1 wherein the temperature of the melt at the end of the blow is maintained at a temperature no greater than 3,450°F.

10. The method of claim 9 wherein said molten ferrous metal and chromium-containing materials are charged into said vessel in the ratio of about 10 percent to 40 percent by weight of cold chromium-containing materials to 50 percent to 90 percent by weight of molten ferrous metal.

11. The method of claim 1 including the step of increasing the gas flow through said nozzle after a predetermined amount of said mixture of oxygen and non-oxidizing gas has been blown onto the surface to increase the gas input pressure on the molten metal bath.

\* \* \* \* \*